US007177304B1

(12) United States Patent
Mo et al.

(10) Patent No.: US 7,177,304 B1
(45) Date of Patent: Feb. 13, 2007

(54) DEVICES, SOFTWARES AND METHODS FOR PRIORITIZING BETWEEN VOICE DATA PACKETS FOR DISCARD DECISION PURPOSES

(75) Inventors: Ning Mo, Dublin, CA (US); Carlos Laux, San Ramon, CA (US); Geethgayathri Ramachandran, Sunnyvale, CA (US); Chunyan Li, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 983 days.

(21) Appl. No.: 10/038,539

(22) Filed: Jan. 3, 2002

(51) Int. Cl.
*H04L 12/66* (2006.01)
(52) U.S. Cl. .................. 370/356; 370/477; 704/214
(58) Field of Classification Search ................ 370/477, 370/352, 356, 401; 704/215, 214
See application file for complete search history.

(56) References Cited

U.S. PATENT DOCUMENTS

| 5,548,680 | A  | * | 8/1996  | Cellario ........................ 704/219 |
| 5,732,389 | A  | * | 3/1998  | Kroon et al. ................. 704/223 |
| 6,324,174 | B2 | * | 11/2001 | Bharucha et al. ............ 370/352 |
| 6,490,556 | B1 | * | 12/2002 | Graumann et al. .......... 704/233 |
| 6,522,663 | B1 | * | 2/2003  | Bharucha et al. ............ 370/465 |
| 6,614,781 | B1 | * | 9/2003  | Elliott et al. ................. 370/352 |
| 6,697,353 | B2 | * | 2/2004  | Bharucha et al. ............ 370/352 |
| 6,807,525 | B1 | * | 10/2004 | Li et al. ....................... 704/215 |
| 2004/0128130 | A1 | * | 7/2004 | Rose et al. .................. 704/236 |

* cited by examiner

*Primary Examiner*—Min Jung
(74) *Attorney, Agent, or Firm*—Marger Johnson & McCollom, P.C.

(57) ABSTRACT

Devices, softwares and methods for prioritizing between voice data packets for discard decision purposes. A perceptual importance of a voice data packet relative to the others is determined at encoding, preferably according to the content of the encoded sound. The relative importance is represented as a comparative discardability code in the packet. If a discard decision is made, it takes into account the comparative discardability code of the packet, thus preferring to discard the unimportant packets more frequently.

48 Claims, 6 Drawing Sheets

500

| 510 | RECEIVE VOICE SIGNALS |

| 520 | GROUP THE VOICE SIGNALS INTO DATA SPEECH FRAMES |

| 530 | ANALYZE THE VOICE SIGNALS OF A FRAME TO CLASSIFY IT ACCORDING TO TYPE OF SPEECH |

| 540 | DETERMINE A COMPARATIVE DISCARDABILITY FOR SOME OF THE DATA SPEECH FRAMES RELATIVE TO OTHERS FROM THE TYPE OF SPEECH |

| 550 | ENCAPSULATE THE DATA SPEECH FRAMES INTO VOICE DATA PACKETS WHICH INCLUDE COMPARATIVE DISCARDABILITY CODES INDICATING THE DETERMINED COMPARATIVE DISCARDABILITY OF THE ENCAPSULATED DATA SPEECH FRAMES |

| 560 | TRANSMIT THE VOICE DATA PACKETS THROUGH A PACKET SWITCHED NETWORK |

FIG. 5

DEVICES, SOFTWARES AND METHODS FOR PRIORITIZING BETWEEN VOICE DATA PACKETS FOR DISCARD DECISION PURPOSES

CROSS REFERENCE TO RELATED APPLICATIONS

The present application may be found to be related to U.S. patent application Ser. No. 10/038,337, filed on Jan. 3, 2002.

BACKGROUND OF THE INVENTION

1. Field of the Invention

The present invention is related to the field of communications through networks, and more specifically to devices, softwares and methods for prioritizing between voice data packets for discard decision purposes.

2. Description of the Related Art

Networks, such as the internet, are increasingly used for communications. The Internet Protocol (IP) has been developed for communications through the internet.

Like other packet network technologies, the Internet Protocol (IP) was initially designed to transport data in a reliable and robust way. IP ensures that all data is delivered, even though in an asynchronous mode.

It was only later that networks started being used for transporting video data and voice data. The latter takes place using a Voice over Internet. Protocol (VoIP). VoIP ensures that voice data are retransmitted in real time. If any are lost, they are not retransmitted. If any arrive too late, they are not incorporated in the playout.

Since the initial design of IP focused on transferring data asynchronously, it largely ignored considerations such as Quality of Service (QoS) for VoIP. Accordingly, as VoIP evolves, more and more efforts are being made to ensure an acceptable QoS over networks, such as IP networks. Schemes are developed, such as Resource Reservation Protocol (RSVP) and Class Based Queuing (CBQ). These schemes also address how to handle the difficult situations, such as congestion in a network, etc.

CBQ techniques define several logical queues in a memory buffer. Each queue is assigned a priority. As each incoming packet is received, it is sorted into one of these queues, where it awaits retransmission. Sorting is based on a number of criteria, such as the Type of Service (ToS) field of the packet, or a combination of source address, destination address and port. Then a scheduler selects one of the queues based on its relative priority, and forwards packets from it to the interface physical queue, from where they are routed.

Since voice and video data packets have to be retransmitted at real time, they tend to be given a higher priority than data. And that is in networks that were initially designed for data, instead of voice or video.

When there is a congestion in a network due to voice traffic, some of the packets carrying voice data are dropped. This means they are discarded, without being retransmitted, which guarantees they will not arrive for playout.

Discarding voice packets takes place randomly, depending only on the condition of network congestion. The CBQ techniques do not differentiate between packets within a queue.

The speech is reconstructed for playout. Packets that got dropped along the way are typically reconstructed by interpolation from their neighboring packets that did arrive.

The problem is that, for reconstructing speech, some packets are more perceptually important than others. But their relative importance is not accounted for in the discard decisions of a congested router. Accordingly, an important packet has an equal chance of being discarded as a less important packet. When important packets are discarded, interpolation aggravates the fact that they are missing. Thus the reconstructed voice can have a poor quality, even if the network is only mildly congested.

BRIEF SUMMARY OF THE INVENTION

The present invention overcomes these problems and limitations of the prior art.

Generally, the present invention provides devices, softwares and methods for prioritizing between voice data packets for discard decision purposes. A perceptual importance of a voice data packet relative to the others is determined at encoding. The relative importance is represented in the packet as a comparative discardability code. If a discard decision is made, it takes into account the comparative discardability code of the packet.

The invention offers the advantage that the determination of which packets of a stream should be discarded is made at the location of where encoding takes place. The determination of which packets are more important than the others is advantageously made according to the content of the encoded sound. Accordingly, when discarding takes place, the less important packets are discarded more often. Since the important packets survive dropping more frequently, the resulting reconstructed stream is affected minimally, even in the face of heavy network congestion.

The invention will become more readily apparent from the following Detailed Description, which proceeds with reference to the drawings, in which:

BRIEF DESCRIPTION OF THE DRAWINGS

FIG. 5 is a flowchart illustrating a method according to an embodiment of the present invention.

DETAILED DESCRIPTION OF THE PREFERRED EMBODIMENT(S)

As has been mentioned, the present invention provides devices, softwares and methods for prioritizing between voice data packets for discard decision purposes. The invention is now described in more detail.

Figure 1:
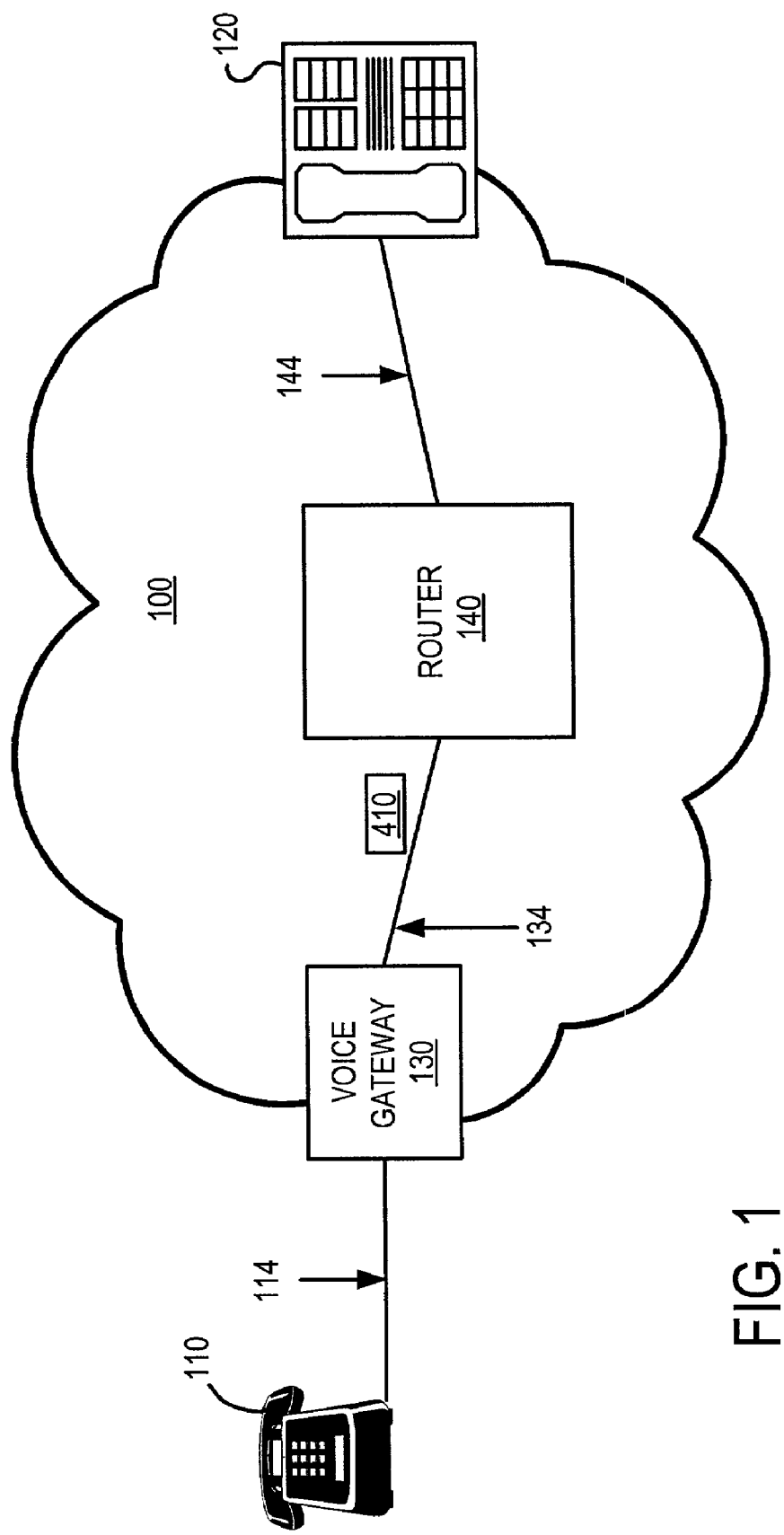
FIG. 1 is a network diagram showing a voice gateway made according to an embodiment of the present invention establishing a telephone call connection via a router made according to an embodiment of the present invention through a network.

Referring now to FIG. 1, a diagram is shown for network 100. Network 100 may be any packet switched communications network, such as the internet, a local area network (LAN), a metropolitan area network (MAN), an intranetwork of an organization, etc.

A telephone 110 is a common, circuit switched telephone. Its user makes a call to a telephone 120, which is a packet switched telephone, also known as IP telephone. Since telephone 120 is accessible through network 100, a connection is established through network 100.

More particularly, telephone 110 first establishes a connection 114 with a voice gateway 130 in network 100. Voice gateway 130 establishes a packet switched connection 134 with a router 140, and router 140 establishes a packet switched connection 144 with telephone 120, to complete the connection. In fact, there may also be other routers in the path, in addition to router 140.

Voice gateway 130 is made according to an embodiment of the present invention, as will be understood from the below. Voice gateway 130 transmits voice data packets to router 140 along connection 214. At least one such packet 410 is shown.

Router 140 is also made according to an embodiment of the invention. It receives packets along connection 134, such as packet 410. Router 140 may experience congestion, in which case it may have to discard some of the voice data packets, without retransmitting them to IP telephone 120. Router 140 looks to the content of packets, such as packet 410, to make a better educated decision as to which ones of the packets to discard.

The above is simply one of many possible configurations for the invention to work. If either voice gateway 130 or router 140 is not made according to the invention, retransmission will indeed happen, but the benefit of the invention will not be realized. Particularly, if a router is not made according to the invention, it will not look to the packets, to determine which packets are more desirable to discard, as in the prior art. Alternately, if a voice gateway is not made according to the invention, router 140 may look but not understand which packets are more desirable to discard.

Figure 2:
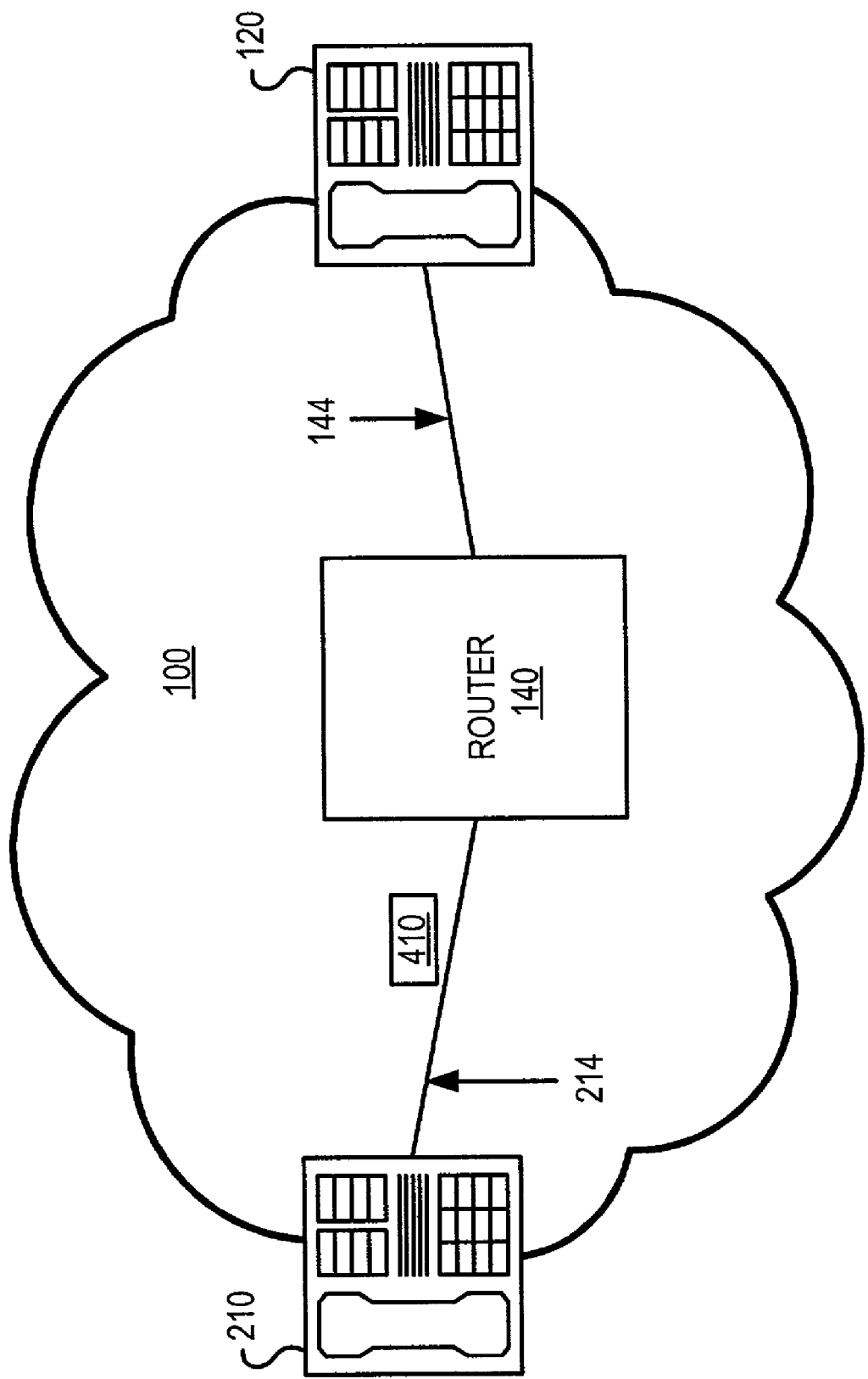
FIG. 2 is another network diagram showing an IP telephone made according to an embodiment of the present invention establishing a telephone call connection through the network of FIG. 1.

Referring to FIG. 2, another configuration is shown, which has similarities with that of FIG. 1, so as to facilitate the present description. An IP telephone 210 made according to the invention establishes a call with the same IP telephone 120 as in FIG. 1, through the same network 100. IP telephone 210 establishes a packet switched connection 214 with router 140. The remainder of the connection is the same.

IP telephone 210 is made according to an embodiment of the present invention, as will be understood from the below. IP telephone 210 transmits voice data packets to router 140 along connection 214. At least one such packet 410 is shown.

Figure 3:
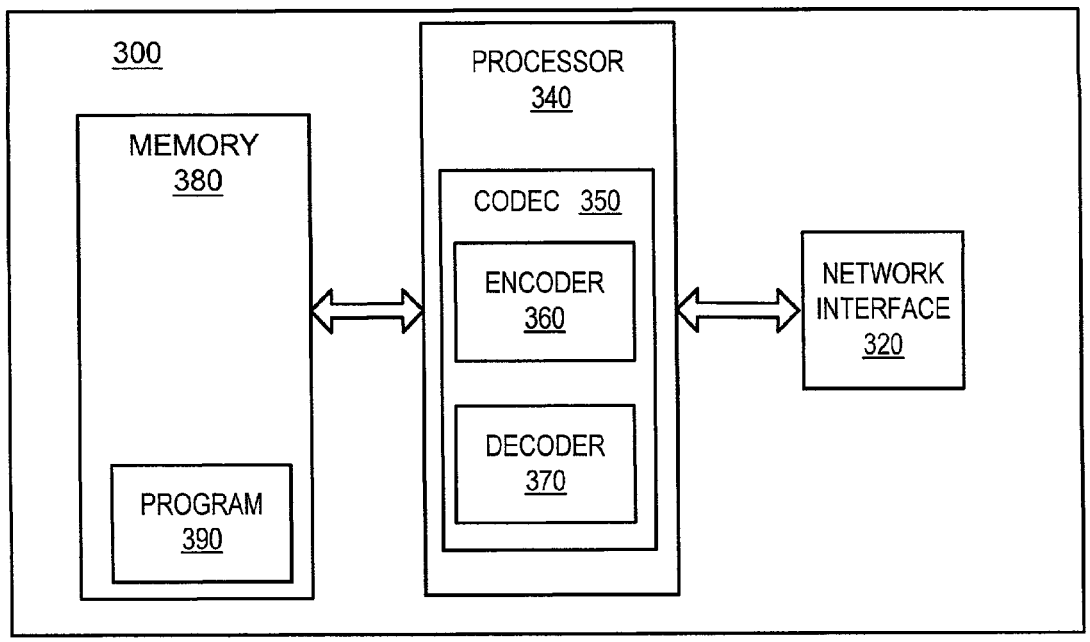
FIG. 3 is a block diagram of a network device made according to the invention.

Referring now to FIG. 3, a network device 300 made according to an embodiment of the invention is described in more detail. Device 300 may be a voice gateway such as voice gateway 130, an IP telephone such as IP telephone 210, etc.

Device 300 may be implemented by combining separate components. Alternately, one or more of the components of device 300 may be implemented as an Application Specific Integrated Circuit (ASIC), etc.

Device 300 has a network interface 320 for interfacing with a network, such as network 100.

Device 300 also has a processor 340 coupled with network interface 320. Processor 340 may include a codec 350 which is made from a voice encoder 360 and a voice decoder 370.

Processor 340 may be implemented as a Central Processing Unit (CPU), or any other equivalent way known in the art. In one embodiment, device 300 additionally includes a memory 380, on which a program 390 may reside. Functions of processor 340 may be controlled by program 390, as will become apparent from the below. Alternately, processor 340 may be implemented as a Digital Signal Processor (DSP), etc.

Figure 4:
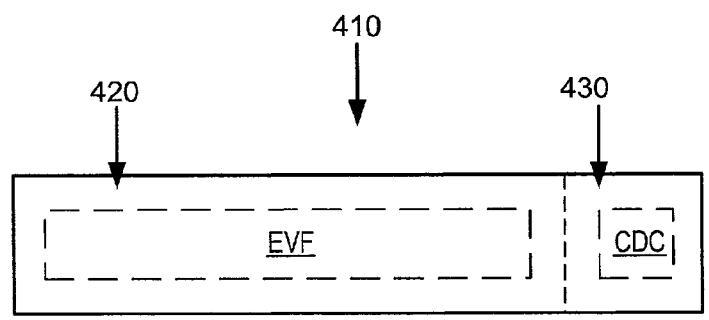
FIG. 4 is a diagram of a data packet made, transmitted and received according to an embodiment of the present invention.

Referring to FIG. 4, a diagram is shown of a data packet 410. Packet 410 is made according to an embodiment of the present invention by device 300. Packet 410 is transmitted through network 100 along a packet switched connection, such as connection 134 of FIG. 1 or connection 214 of FIG. 2.

Packet 410 includes a payload 420 and a header 430. Payload 420 includes at least one encoded voice frame EVF of the telephone conversation. Frame EVF is made from data bits. Header 430 is interpreted by a retransmitting network device, to direct where packet 410 will be sent to.

Packet 410 includes a comparative discardability code CDC according to the invention. Code CDC indicates a discardability of frame EVF relative to frames in other packets (not shown).

Code CDC may be located anywhere in packet 410. It is highly preferred that code CDC be part of header 430. For example, header 430 may be a Real-Time Transport Protocol (RTP) header, and code CDC may be part of an extension of RTP header 430.

Code CDC may be just one bit. By convention, the bit may be "1" to signify a higher discardability of a packet whose bit is "0".

As will be understood also from the below, code CDC does not determine for certain whether packet 410 will be discarded or not. If there is no congestion in network 100, then packet 410 will probably not be discarded at all. If network 100 is congested, then a code of "1" will make it a more likely discard candidate, than a packet a code of "0".

This selection process at router 140 will result in salient portions of the speech having a better chance of being transmitted, as opposed to non salient such portions. Reconstruction, therefore, will produce better sounding voice for the user of telephone 120.

The invention may be practiced if all the voice data packets are configured as packet 410, but that is not necessary. Only some voice data packets out of the entire stream need have a CDC code. The remaining voice data packets may, by convention, be deemed more desirable or less than those with the CDC codes.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer. Alternately, the device may be implemented an Application Specific Integrated Circuit (ASIC), etc.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps; for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. It will be appreciated that some of these methods may include software steps which may be performed by different modules of an overall parts of a software architecture. For example, data forwarding in a network switch (such as a router or a bridge) may be performed in a data plane, which consults a local routing table. Collection of performance data may also be performed in a data plane. The performance data may be processed, and accordingly used in a control plane to update the local routing table, in addition to neighboring ones. A person skilled in the art will discern which step is best performed in which plane.

Referring now to FIG. 5, a flowchart 500 is used to illustrate a method according to an embodiment of the invention. The method of flowchart 500 may also be practiced by voice gateway 130, IP telephone 210, device 300, etc.

According to a box 510, voice signals are received.

According to a next box 520, the voice signals are grouped into data speech frames.

According to a next box 530, the voice signals of at least some of the frames are analyzed. Each frame is thus classified according to a type or class of speech.

From studies of speech production process, human speech sounds can be classified into three distinct classes according to their production process.

Voiced sounds are produced by forcing air through the glottis with the tension of the vocal cords adjusted, so that they vibrate in a relaxation oscillation, thereby producing quasi-periodic pulses of air, which in turn excite the vocal trace.

Unvoiced sounds are generated by forming a constriction at some point in the vocal tract (usually toward the mouth end), and forcing air through the constriction at a high enough velocity to produce turbulence. This creates a broad-spectrum noise source to excite the vocal tract.

Polsive sounds result from making a complete closure (again, usually toward the front of the vocal tract), building up pressure behind the closure, and abruptly releasing it.

Studies also show that 60% of the time the caller doesn't talk (silence period) for a normal telephone conversation. Discontinuous transmission a schemes (silence compression using Voice Activated Detection (VAD) and Comfort Noise Generation (CNG)] are commonly used to reduce bandwidth required for voice traffic. Even with advanced VAD algorithms, however, there has to be some hangover time of encoding silence to avoid backend clipping. So with VAD on, many of the transmitted voice packets are still silence frames.

According to a next box 540, a comparative discardability is determined for some of the data speech frames relative to others. The determination is made according to the perceptual importance of the speech frames relative to each other. The relative importance is determined from the type or class of speech, and from some empirical data. Namely, from the auditory perception point of view, the human brain is sensitive to transitions from one kind of sound to another, for example, from Voiced sound to Unvoiced sound, or Unvoiced to Voiced. In contrast, the human brain is not so sensitive to the missing gap in between one kind of continuous sound, because it is smart enough to interpolate the missing part if the gap is short.

According to a next box 550, the data speech frames are encapsulated into data packets, such as packet 410. These data packets include comparative discardability codes indicating the determined comparative discardability of the encapsulated data speech frames According to a next box 560, the data packets are transmitted through a packet switched network, such as network 100.

Figure 6:
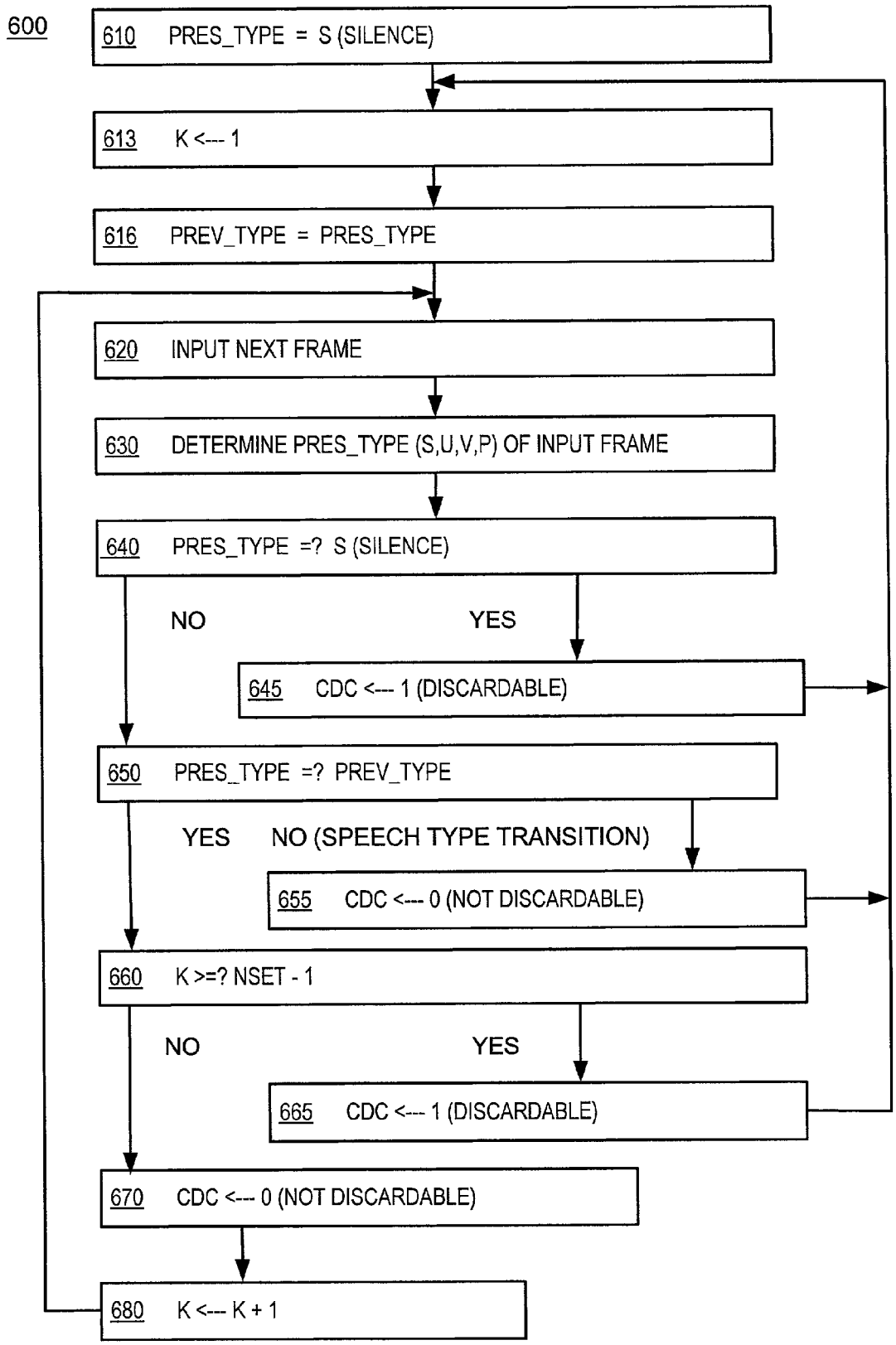
FIG. 6 is a flowchart illustrating a method for performing a box of the flowchart of FIG. 5 according to an embodiment of the present invention.

Referring now to FIG. 6, a flowchart 600 is used to illustrate a preferred method for performing box 540 of FIG. 5. It will be appreciated that flowchart 600 exploits the known empirical data mentioned above.

According to a box 610, a present speech type variable PRES_TYPE is set to any one of possible types of speech. The preferred one is S, which is defined for silence.

According to a next box 613, a counter K of frames is set to 1. If this is not the first time box 620 is executed, then counter K is reset to 1.

According to a next box 616, a previous speech type variable PREV_TYPE is set as equal to the present speech type variable PRES_TYPE.

According to a next box 620, a next voice frame is input for consideration.

According to a next box 630, a speech type of the frame is determined, and stored as the present speech type variable PRES_TYPE. The speech type may be S (for silence), U (for unvoiced), V (for voiced) and P (for Polsive). Other groupings of the types are also possible.

According to a next box 640, it is inquired whether the present speech type variable PRES_TYPE encodes S for silence. If yes, then according to a next box 645, a code CDC for the frame is set to 1 (for discardable), and execution returns to box 620. In other words, a data packet encapsulating a frame of silence is assigned a high comparative discardability.

If not, then according to a next box 650, it is inquired whether the present speech type variable PRES_TYPE encodes the same as the previous type speech variable PREV_TYPE. If not, it means there is a transition in speech type. Then according to a next box 655, a code CDC for the frame is set to 0 (for non-discardable), and execution returns to box 620. In other words, a data packet encapsulating a frame that transitions from one type of speech to another is assigned a low comparative discardability.

If not, then according to a next box 660, it is optionally inquired whether the counter K has reached up to one less from a first preset number NSET. The number NSET may be the same for all the types of speech, or different between types. If yes, it means that there are a number of frames with the same type of speech in a row. Then according to an optional next box 665, a code CDC for the frame is set to 1 (for discardable), and execution returns to box 620. A good value for NSET is 5.

In other words, when a segment has the same type of speech for many frames, every 5th frame is assigned a higher comparative discardability. It may be dropped, and the deterioration in the perception of sound will be the least. Plus, the reconstructive interpolation at playout will rectify this type of missing packet with the best fidelity.

If at box 660 the counter K has not reached up to one less from number NSET, then according to a next box 670, a code CDC for the frame is set to 0 (for non-discardable).

According to a next box 680, the counter K is incremented by 1. Then execution returns to box 620.

Figure 7:
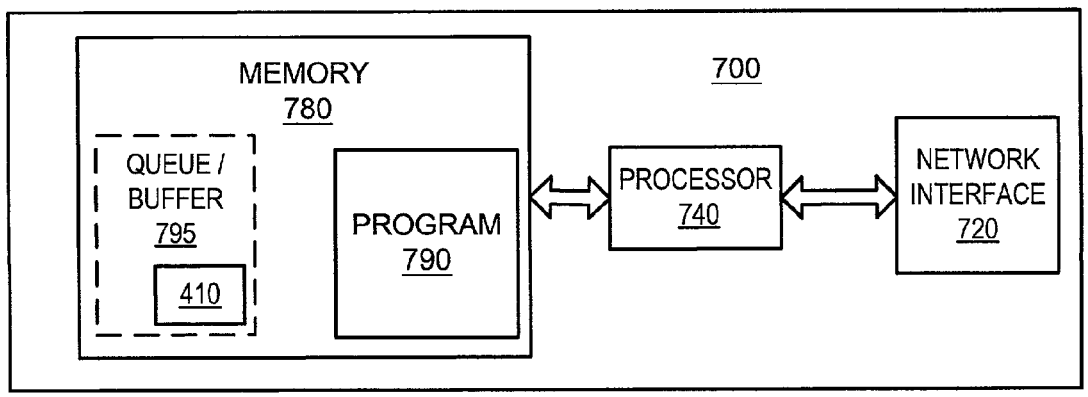
FIG. 7 is a block diagram of another network device made according to the invention.

Referring now to FIG. 7, a network device 700 made according to an embodiment of the invention is described in more detail. Device 700 may be a router such as router 140, abridge, etc.

Device 700 may be implemented by combining separate components. Alternately, one or more of the components of device 700 may be implemented as an Application Specific Integrated Circuit (ASIC), etc.

Device 700 has a network interface 720 for interfacing with a network, such as network 100.

Device 700 also has a processor 740 coupled with network interface 720. Processor 740 may be implemented as a Central Processing Unit (CPU), or any other equivalent way known in the art. In one embodiment, device 700 additionally includes a memory 780, on which a program 790 may reside. Functions of processor 740 may be controlled by program 790, as will become apparent from the below. Alternately, processor 740 may be implemented as a Digital Signal Processor (DSP), etc.

Memory 780 has a portion allocated as a waiting queue 796. Queues are also called buffers. Received packets, such as packet 410 are stored in buffer 796 until retransmission.

Figure 8:
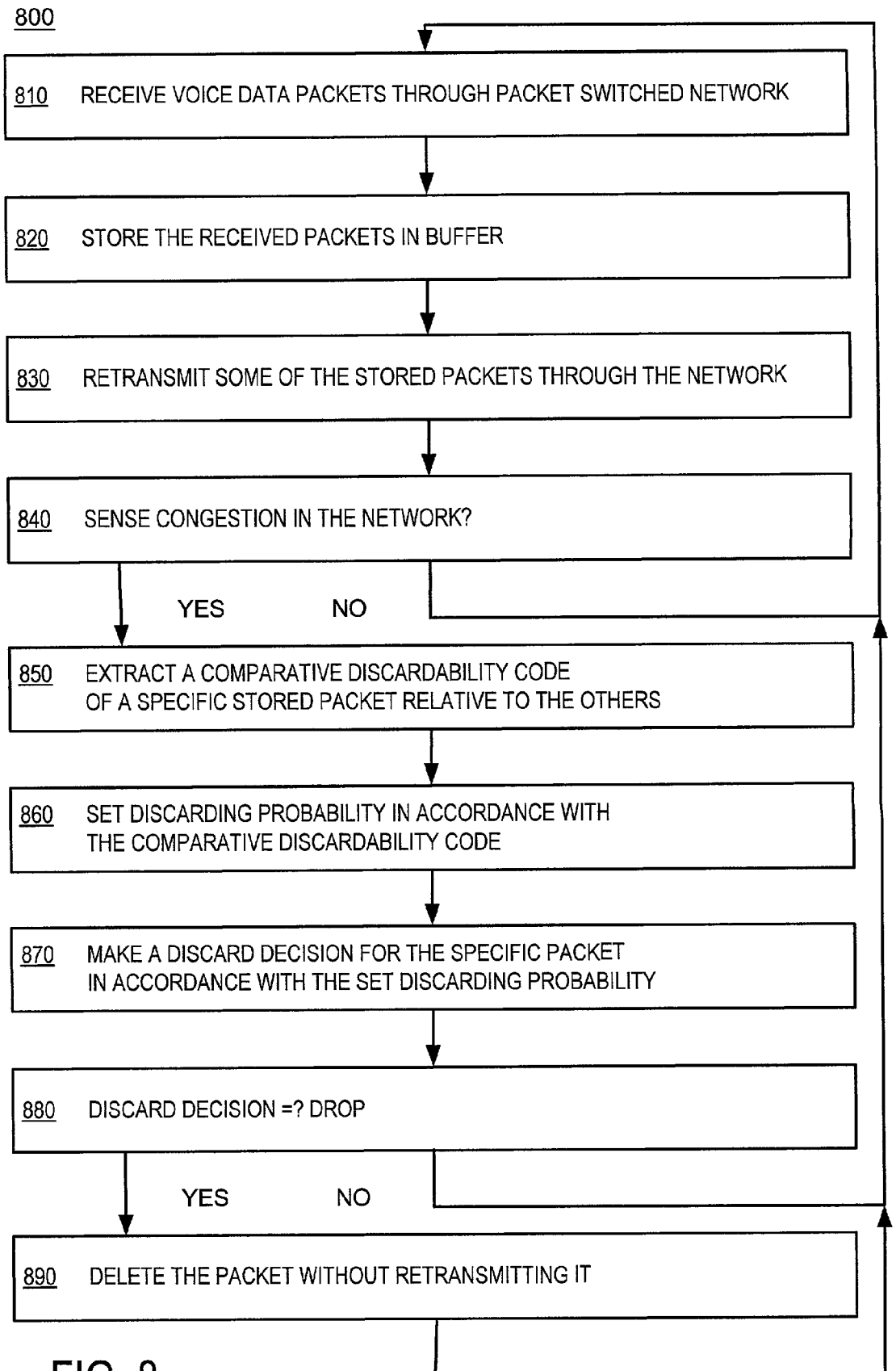
FIG. 8 is a flowchart illustrating a method according to yet another embodiment of the present invention.

Referring now to FIG. 8, a flowchart 800 is used to illustrate a method according to an embodiment of the invention. The method of flowchart 800 may also be practiced by router 140, network device 700, etc.

According to a box 810, voice data packets are received through a packet switched network such as network 100.

According to a next box 820, the received packets are stored in a queue, such as buffer 796.

According to a next box 830, some of the stored packets are retransmitted through the network from the queue.

According to a next box 840, it is inquired whether congestion is sensed in the network. If not, then execution returns to box 810.

If yes, then according to a next box 850, a comparative discardability code CDC of a specific stored packet relative to the others is extracted. The CDC is known to be related to preset types of speech.

According to an optional next box 860, a discarding probability is set in accordance with the comparative discardability code CDC, and the preset types of speech. If CDC is 1, the discarding probability is set higher than would be otherwise. If CDC is 0, the discarding probability is set lower than would be otherwise.

According to a next box 870, a discard decision is made for the specific packet, in accordance with the known type of speech. If optional box 860 has been executed, the discard decision is made in accordance with the set discarding probability.

According to a next box 880, it is inquired if the discard decision is to drop the packet. If not, then execution returns to box 810.

If yes, then according to a next box 890, the packet is deleted from the buffer without being retransmitted. Then execution returns to box 810.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention. For example, the teachings of the invention may also be applied to conferencing of more than two calls, using voice and/or video, etc.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
   a network interface for coupling to a network; and
   one or more processors coupled with the network interface, in which the processors are adapted to:
   receive voice signals;
   group the voice signals into a plurality of serial data speech frames;
   analyze the voice signals of at least some of the data speech frames to classify each in one of a plurality of different types of speech;
   determine a comparative discardability for some of the data speech frames relative to others from the type of speech;
   encapsulate the data speech frames into data packets, at least some of the data packets including a comparative discardability code indicating the determined comparative discardability of the encapsulated data speech frames; and
   transmit the data packets through a packet switched network;
   wherein determining a comparative discardability for the classified serial data speech frames further includes comparing one of the data speech frames to adjacent frames and associating a different comparative discardability with the data speech frame when there are differences between the frame and the adjacent frames.

2. The device of claim 1, in which the comparative discardability code is in an extension of an RTP header.

3. The device of claim 1, in which the types of speech include voiced and polsive sounds.

4. The device of claim 1, in which:
   one of the types of speech is silence, and
   a data packet encapsulating a frame of silence is assigned a high comparative discardability.

5. The device of claim 1, in which:
   a data packet encapsulating a frame that transitions from one type of speech to another is assigned a low comparative discardability.

6. The device of claim 1 wherein the device is incorporated in an IP (Internet Protocol) telephone.

7. The device of claim 1, wherein the device is incorporated in a voice gateway separating a circuit switched network and the packet switched network.

8. The device of claim 1, wherein a different comparative discardability is associated with the data speech frame when either of the adjacent speech frames have a different speech type than the frame.

9. The device of claim 8, wherein a low comparative discardability is associated with the data speech frame when either of the adjacent speech frames have a different speech type than the frame.

10. The device of claim 8, wherein a high comparative discardability is associated with the data speech frame when both of the adjacent speech frames have a same speech type as the frame.

11. A device comprising:
    a network interface for coupling to a packet switched network; and
    one or more processors coupled with the network interface, in which the processors are adapted to:
    receive voice signals;
    group the voice signals into a plurality of serial data speech frames;
    analyze the voice signals of at least some of the data speech frames to classify each in one of a plurality of different types of speech;
    determine a comparative discardability for some of the data speech frames relative to others from the type of speech;
    encapsulate the data speech frames into data packets, at least some of the data packets including a comparative discardability code indicating the determined comparative discardability of the encapsulated data speech frames; and
    transmit the data packets through the packet switched network;
    in which the processors are further adapted to:
    assign a similar comparative discardability to a first preset number of serially occurring data speech frames of a first one of the types of speech; and
    assign a next occurring data speech frame of the first type of speech a higher comparative discardability.

12. The device of claim 11, in which the processors are further adapted to:
    assign a similar comparative discardability to a second preset number of serially occurring data speech frames of a second one of the types of speech; and
    assign a next occurring data speech frame of the second type of speech a higher comparative discardability,
    in which the first preset number is different from the second preset number.

13. A device comprising:
    a network interface for coupling to a packet switched network; and
    one or more processors coupled with the network interface, in which the processors are adapted to:

receive voice data packets through the packet switched network, the voice data packets encoding a data speech frame that contains a first type of speech a second type of speech and a transition type of speech that occurs during a transition between the first and second types of speech;

extract a comparative discardability code of a specific one of the received packets, the comparative discardability code indicating whether the specific packet corresponds to the transition type of speech or another type of speech; and determine whether to transmit the specific packet according to the extracted comparative discardability code that indicates whether the specific packet corresponds to the transition type of speech or another type of speech.

14. The device of claim 13, in which the processors are further adapted to:
sense a congestion in the packet switched network, and
in which the comparative discardability code is extracted responsive to sensing the congestion.

15. The device of claim 13, in which the processors are further adapted to:
set a discarding probability in accordance with the comparative discardability code, and
in which the transmission determination is made in accordance with the set discarding probability.

16. A device comprising:
means for receiving voice signals;
means for grouping the voice signals into a plurality of serial data speech frames;
means for analyzing the voice signals of at least some of the data speech frames to classify each in one of a plurality of different types of speech;
means for determining a comparative discardability for some of the data speech frames relative to others from the type of speech;
means for encapsulating the data speech frames into data packets, at least some of the data packets including a comparative discardability code indicating the determined comparative discardability of the encapsulated data speech frames; and
means for transmitting the data packets through a packet switched network;
in which a data packet encapsulating frame that is associated with a transition from one type of speech to another is assigned a low comparative discardability.

17. The device of claim 16, in which the comparative discardability code is in an extension of an RTP header.

18. The device of claim 16, in which the types of speech include voiced and polsive sounds.

19. The device of claim 16, in which:
one of the types of speech is silence, and
a data packet encapsulating a frame of silence is assigned a high comparative discardability.

20. A device comprising:
means for receiving voice signals;
means for grouping the voice signals into a plurality of serial data speech frames;
means for analyzing the voice signals of at least some of the data speech frames to classify each in one of a plurality of different types of speech;
means for determining a comparative discardability for some of the data speech frames relative to others from the type of speech;
means for encapsulating the data speech frames into data packets, at least some of the data packets including a comparative discardability code indicating the determined comparative discardability of the encapsulated data speech frames;

means for transmitting the data packets through a packet switched network;

means for assigning a similar comparative discardability to a first preset number of serially occurring data speech frames of a first one of the types of speech; and means for assigning a next occurring data speech frame of the first type of speech a higher comparative discardability.

21. The device of claim 20, further comprising:
means for assigning a similar comparative discardability to a second preset number of serially occurring data speech frames of a second one of the types of speech; and
means for assigning a next occurring data speech frame of the second type of speech a higher comparative discardability,
in which the first preset number is different from the second preset number.

22. A device comprising:
means for receiving voice data packets through a packet switched network;
means for storing the received packets in a buffer;
means for retransmitting some of the stored packets through the packet switched network;
means for extracting a comparative discardability code of a specific one of the stored packets relative to the others, wherein the comparative discardability code is related to a preset type of encoded speech;
means for making a discard decision for the specific packet in accordance with the extracted comparative discardability code and the preset type of speech; and
means for deleting the specific packet without transmission when the discard decision is to drop the packet;
wherein the extracted comparative discardability code for at least one packet is based on both attributes of a source voice data frame for the packet and attributes of non-source voice data frames.

23. The device of claim 22, further comprising:
means for sensing a congestion in the packet switched network, and
in which the comparative discardability code is extracted responsive to sensing the congestion.

24. The device of claim 22, further comprising:
means for setting a discarding probability in accordance with the analyzed comparative discardability code,
in which the discard decision is made in accordance with the set discarding probability.

25. An article comprising: a storage medium, the storage medium having instructions stored thereon, in which when the instructions are executed by at least one device, the instructions result in:
identifying a predetermined type of sound, the predetermined type of sound corresponding to an abrupt release of a complete closure in a vocal tract, the abrupt release of the complete closure allowing air particles located in a high pressure region behind the complete closure to travel to a low pressure region in front of the complete closure and towards a mouth;
receiving voice signals;
grouping the voice signals into a plurality of serial data speech frames;
analyzing the voice signals to classify at least one of the data speech frames as containing the predetermined type of sound;

encapsulating the classified data speech frame containing the predetermined type of sound into a first group of packets;

assigning the first group of packets a first comparative discardability code that is different than a second comparative discardability code assigned to a second group of packets representing a different data speech frame that does not include the predetermined type of sound; and transmitting the first and second groups of packets through a packet switched network.

26. The article of claim 25, in which the first comparative discardability code is in an extension of an RTP header.

27. The article of claim 25, in which the second packets correspond to polsive sounds.

28. The article of claim 25, in which:
the second packets correspond to silence, and
the second comparative discardability code indicates greater discardability than the first comparative discardability code.

29. The article of claim 25, in which the second packets correspond to transition speech and the second comparative discardability code identifies a lower discardability than the first comparative discardability code.

30. The article of claim 25, in which the instructions further result in:
assigning a similar comparative discardability to a first preset number of serially occurring data speech frames of a same type of speech; and
assigning a next occurring data speech frame of the same type of speech a higher comparative discardability.

31. The article of claim 30, in which the instructions further result in:
assigning a common comparative discardability to a second preset number of serially occurring data speech frames of a homogenous type of speech; and
assigning a next occurring data speech frame of the homogenous type of speech a higher comparative discardability,
in which the first preset number is different from the second preset number.

32. An article comprising: a storage medium, the storage medium having instructions stored thereon, in which when the instructions are executed by at least one device, the instructions result in:
receiving voice data packets through a packet switched network;
storing the received packets in a buffer;
retransmitting some of the stored packets through the packet switched network;
extracting a comparative discardability code of a specific one of the stored packets relative to the others, wherein the comparative discardability code is related to a preset type of encoded speech;
making a discard decision for the specific packet in accordance with the extracted comparative discardability code and the preset type of speech; and
deleting the specific packet without transmission when the discard decision is to drop the packet;
wherein the comparative discardability code is further related to a speech type transition.

33. The article of claim 32, in which the instructions further result in:
sensing a congestion in the packet switched network, and
in which the comparative discardability code is extracted responsive to sensing the congestion.

34. The article of claim 32, in which the instructions further result in:
setting a discarding probability in accordance with the analyzed comparative discardability code,
in which the discard decision is made in accordance with the set discarding probability.

35. A method comprising:
receiving voice signals;
grouping the voice signals into a plurality of serial data speech frames;
analyzing the voice signals of at least some of the data speech frames to classify each in one of a plurality of different types of speech,
analyzing the serial classified frames for speech type transitions,
identifying voice data speech frames both immediately preceding and immediately following the speech type transitions,
determining a comparative discardability for some of the data speech frames relative to others from the type of speech;
varying the comparative discardability determinations according to the identified frames;
encapsulating the data speech frames into data packets, at least some of the data packets including a comparative discardability code indicating the determined comparative discardability of the encapsulated data speech frames; and
transmitting the data packets through a packet switched network.

36. The method of claim 35, in which the comparative discardability code is in an extension of an RTP header.

37. The method of claim 35, in which the types of speech include voiced and polsive sounds.

38. The method of claim 35, in which:
one of the types of speech is silence, and
a data packet encapsulating a frame of silence is assigned a high comparative discardability.

39. The method of claim 35, in which a data packet encapsulating a frame that transitions from one type of speech to another is assigned a low comparative discardability.

40. A method comprising:
receiving voice signals;
grouping the voice signals into a plurality of serial data speech frames;
analyzing the voice signals of at least some of the data speech frames to classify each in one of a plurality of different types of speech,
determining a comparative discardability for some of the data speech frames relative to others from the type of speech;
encapsulating the data speech frames into data packets, at least some of the data packets including a comparative discardability code indicating the determined comparative discardability of the encapsulated data speech frames;
transmitting the data packets through a packet switched network;
assigning a similar comparative discardability to a first preset number of serially occurring data speech frames of a first one of the types of speech; and
assigning a next occurring data speech frame of the first type of speech a higher comparative discardability.

41. The method of claim 40, further comprising:
assigning a similar comparative discardability to a second preset number of serially occurring data speech frames of a second one of the types of speech; and
assigning a next occurring data speech frame of the second type of speech a higher comparative discardability,
in which the first preset number is different from the second preset number.

42. A method comprising:
receiving packetized data representing a sound that contains a transition type of speech and a non-transition type of speech;
extracting comparative discardability codes from the packetized data, the comparative discardability codes indicating a different discardability for first packets representing the transition type of speech and second packets representing the non-transition type of speech; and
discarding either the first or second packets according to the extracted comparative discardability codes.

43. The method of claim 42, further comprising:
sensing a congestion in a network, and
in which the comparative discardability codes are extracted responsive to sensing the congestion.

44. The method of claim 42, further comprising:
setting a discarding probability in accordance with the analyzed comparative discardability codes,
in which discarding is according to the set discarding probability.

45. A method, comprising:
providing packets representing voice signals;
classifying packets representing sounds produced by manipulation of a degree of closure in a mouth end of a vocal tract into a vocal tract mouth-end-manipulation sound group;
classifying packets representing sounds produced by forcing air through tensed vocal cords in a glottis end of the vocal tract independently of any closures in the mouth end of the vocal tract into a voiced sound group;
assigning packets classified in the vocal tract mouth-end-manipulation sound group a different comparative discardability than the packets classified in the voiced sound group; and
transmitting both groups of assigned packets over a packet switched network to an endpoint.

46. The method of claim 45 wherein the packets classified in the vocal tract mouth-end-manipulation sound group represent sounds that are produced when pressure behind a complete closure in the mouth end of the vocal tract is abruptly released.

47. The method of claim 45 wherein the packets classified in the vocal tract mouth-end-manipulation sound group represent sounds that are produced when air is forced through a partial closure in the mouth end of the vocal tract.

48. The method of claim 45 wherein the packets classified in the voiced sound group represent voiced sounds that are produced when the mouth end of the vocal tract is completely open.

* * * * *

UNITED STATES PATENT AND TRADEMARK OFFICE
CERTIFICATE OF CORRECTION

PATENT NO. : 7,177,304 B1
APPLICATION NO. : 10/038539
DATED : February 13, 2007
INVENTOR(S) : Mo et al.

It is certified that error appears in the above-identified patent and that said Letters Patent is hereby corrected as shown below:

At column 11, line 3, please replace "first type of speech a second type" with --first type of speech, a second type--.
At column 15, line 29, please replace "analyzed comparative" with --comparative--.

Signed and Sealed this

Eighth Day of September, 2009

David J. Kappos
*Director of the United States Patent and Trademark Office*